United States Patent [19]

Chu et al.

[11] Patent Number: 5,182,315

[45] Date of Patent: Jan. 26, 1993

[54] PHOTOCURABLE SILICONE GEL COMPOSITION, AND METHOD OF MAKING THE SAME

[75] Inventors: Hsien-Kun Chu, Wethersfield; Robert P. Cross, West Simsbury; David I. Crossan, Hebron, all of Conn.

[73] Assignee: Loctite Corporation, Hartford, Conn.

[21] Appl. No.: 615,186

[22] Filed: Nov. 19, 1990

[51] Int. Cl.$^5$ .................... C08F 2/50; C08G 77/16; C08G 77/18; C08G 77/20

[52] U.S. Cl. ........................ 522/37; 522/40; 522/44; 522/46; 522/99; 522/172; 528/31; 528/32; 528/34

[58] Field of Search ............... 528/31, 32, 34; 522/99, 522/172, 37, 40, 44, 46

[56] References Cited

U.S. PATENT DOCUMENTS

| | | | |
|---|---|---|---|
| 3,258,477 | 6/1966 | Plueddemann et al. | 556/416 |
| 4,503,208 | 3/1985 | Lin et al. | 528/15 |
| 4,504,629 | 3/1985 | Lin et al. | 525/288 |
| 4,563,539 | 1/1986 | Gornowicz et al. | 556/421 |
| 4,575,545 | 3/1986 | Nakos | 528/15 |
| 4,575,546 | 3/1986 | Klemarczyk et al. | 526/245 |
| 4,665,147 | 5/1987 | Lien et al. | 528/15 |
| 4,675,346 | 6/1987 | Lin et al. | 522/39 |
| 4,683,251 | 7/1987 | Mikami | 522/46 |
| 4,699,802 | 10/1987 | Nakos et al. | 528/34 |
| 4,845,249 | 7/1989 | Arai et al. | 556/440 |
| 4,952,711 | 8/1990 | Jacobine et al. | 522/99 |

FOREIGN PATENT DOCUMENTS

| | | |
|---|---|---|
| 0240162 | 10/1987 | European Pat. Off. . |
| 262806 | 4/1988 | European Pat. Off. . |
| 273565 | 7/1988 | European Pat. Off. . |
| 276986 | 8/1988 | European Pat. Off. . |
| 332400 | 9/1989 | European Pat. Off. . |
| 348106 | 12/1989 | European Pat. Off. . |
| 363071 | 4/1990 | European Pat. Off. . |
| 3708958 | 9/1988 | Fed. Rep. of Germany . |
| 63-10632 | 1/1988 | Japan . |
| 63-117024 | 5/1988 | Japan . |
| 63-179881 | 7/1988 | Japan . |
| 63-185989 | 8/1988 | Japan . |
| 02110121 | 10/1988 | Japan . |
| 1-14226 | 1/1989 | Japan . |
| 1-279912 | 11/1989 | Japan . |
| 1-304108 | 12/1989 | Japan . |
| 1-318028 | 12/1989 | Japan . |
| 01301708 | 12/1989 | Japan . |

OTHER PUBLICATIONS

"Synthesis of Organosilicon Esters of Hydrazino Carboxylic Acids," Gol'din, G. S., et al, Zhurnal Obschchei Khimii, vol. 43, No. 4, pp. 781-784, Apr. 1973.

*Primary Examiner*—Marion E. McCamish
*Assistant Examiner*—Susan Berman
*Attorney, Agent, or Firm*—Steven J. Hultquist

[57] ABSTRACT

A silicone composition comprising:
(a) a first silane of the formula:

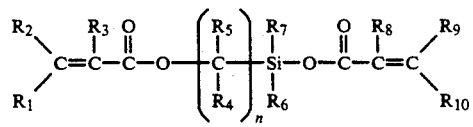

wherein:
  $R_1$, $R_2$, $R_3$, $R_4$, $R_5$, $R_6$, $R_7$, $R_8$, $R_9$, and $R_{10}$ are independently selected from hydrogen, halo, and organo radicals; and
  n is an integer having a value of from 1 to 4;
(b) a second silane of the formula:

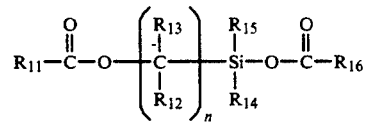

wherein:
  $R_{11}$ and $R_{16}$ are non-polymerizable groups and are independently selected from halo and organo radicals;
  $R_{12}$, $R_{13}$, $R_{14}$, and $R_{15}$ are independently selected from hydrogen, halo, and organo radicals; and
  n is an integer having a value of from 1 to 4; and
(c) a polysiloxane having at least two functional groups per molecule with which said first and second silanes are cappingly reactive;
wherein: (1) the first and second silanes together are provided in sufficient quantity relative to the polysiloxane to react with substantially all of the cappingly reactive functional groups of the polysiloxane; and (2) the first silane constitutes from about 50% to about 98% by weight of the total weight of the first and second silanes.

36 Claims, No Drawings

PHOTOCURABLE SILICONE GEL COMPOSITION, AND METHOD OF MAKING THE SAME

CROSS-REFERENCE TO RELATED APPLICATIONS

Co-filed concurrently herewith are U.S. application Ser. No. 07/615,200 in the names of Hsien-Kun Chu, Robert P. Cross, and David I. Crossan, for "PHOTOCURABLE SILICONE COMPOSITION, AND METHOD OF MAKING THE SAME," and U.S. application Ser. No. 07/615,186 in the names of Edward K. Welch, II, Robert P. Cross, David I. Crossan, and Hsien-Kun Chu for "PHOTOCURABLE SILICONE GEL COMPOSITION, AND METHOD OF MAKING THE SAME" both now allowed.

BACKGROUND OF THE INVENTION

1. Field of The Invention

This invention relates generally to silicone resin compositions, and more specifically to a photocurable silicone gel composition and precursor thereof, and to a method of making same.

2. Description of The Related Art

In the field of silicone chemistry, a variety of silicone compounds, polymers, and formulations have been developed for applications including sealants, conformal coatings, potting materials, and the like. Among the numerous silicone systems developed to date, a wide variety of moisture-curing silicone compositions have evolved, which depend for their cure on atmospheric humidity and/or moisture present on the substrate to which the composition is applied. Although such moisture-curing silicone systems provide good physical properties and performance when fully cured, they suffer the disadvantage that the moisture curing process is relatively slow.

In consequence, effort has been focused in recent years on silicone compositions having other curing modalities which are significantly faster than the moisture-curing process. In particular, photocurable (e.g., UV-curable) silicones have been developed which offer a fast curing speed, far superior to conventional moisture-curing silicones.

In one such UV-curing silicone system which has come into wide usage, a photocurable silicone polymer is prepared by reacting (a) an isomeric mixture of acryloxypropenyldimethylchlorosilane, comprising the isomers:

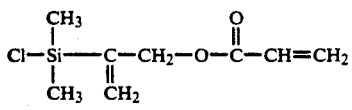

and

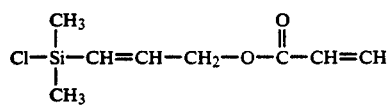

wherein the isomer (I) is present at a concentration of about 75%–80% by weight of the isomeric mixture, and isomer (II) constitutes the balance thereof, with (b) a hydroxyl-terminated dimethylsiloxane fluid of suitable molecular weight, e.g., 20,000–40,000 weight average molecular weight, to yield an acrylic-functional capped silicone polymer. The acrylic-functional capped silicone polymer then is compounded with filler, stabilizer, and a suitable photoinitiator such as benzophenone, to yield a photocurable silicone composition which is very rapidly cured in exposure to UV or other suitable actinic radiation.

The acrylic-functional capper employed to prepare the photocurable silicone polymer described above is typically prepared by selectively hydrosilylating propargyl acrylate at the propargyl group with dimethylchlorosilane. Subsequently, in the endcapping of the hydroxyl-terminated dimethylsiloxane fluid using the resulting isomeric mixture described above, hydrogen chloride is generated, necessitating the addition of a basic hydrogen chloride acceptor, e.g., an amine, to the reaction volume. The amine or other acid acceptor functions to prevent the acid from catalyzing the reversion of the dimethylsiloxane fluid.

While the above photocurable silicone system functions satisfactorily in many applications and has enjoyed wide commercial usage, it nonetheless suffers from several serious problems.

First, and of utmost importance, propargyl acrylate and its precursor, propargyl alcohol, are highly toxic, and thus require precautionary measures in handling and exposure, to ensure safety in their use.

Second, the process employed to make the acrylic-functional capper is complex and expensive. Propargyl alcohol is first esterified to make the propargyl acrylate, and the acrylate then is carefully hydrosilylated to form the acrylic-functional capper.

Third, the capping process, with a base such as an amine being employed as the hydrogen chloride acceptor, generates a base-complexed hydrochloride which is a solid. The formation of this solid complex necessitates the difficult step of filtering the solid from the viscous polymer, which adds to the cost of the process and the photocurable silicone product.

Fourth, the acrylic-functional capper comprises a constituent, viz., the isomer of formula (I) above, which as a $\beta$-oxygenated silicon compound, is readily susceptible to undergoing $\beta$-elimination reaction. For a discussion of $\beta$-elimination chemistry, see C. Eaborn, "Organosilicone Compounds", Butterworths Scientific Publications, London, 1960, pp. 137–138. Thus, the isomer (I) of the capper mixture may undergo $\beta$-elimination reaction to split off allene, thereby rendering the acrylic-functional capper unstable. Further, the resulting photocurable silicone composition comprising the photocured acrylic-functional capped silicone polymer may likewise be unstable due to the presence of the beta-oxygenated silicon linkage therein.

Apart from the above-described deficiencies of conventional photocurable silicone systems, these systems when fully cured are characterized by good toughness and hardness characteristics which in many applications are a decided advantage, however in a number of sealant, potting, and conformal coating applications, it is more desirable to utilize a soft, flexible, pliable and resilient cured material. The latter characteristics may be desired, for example, in applications involving substantial differential thermal expansion characteristics, such as where the silicone material is employed as a sealant between structural elements possessing substantially different thermal conductivity and heat capacity characteristics, in end use environments of rapidly changing temperature. Another end use application where such soft, flexible, pliable, and resilient character is desired, is the use of coatings on substrates or in elements which are expandable or otherwise must accommodate deformational stresses or pressures (e.g., gasket and bushing materials in high pressure hydraulic systems). In such applications, fully capped photocurable silicone compositions are excessively hard and inelastic, and their use entails the risk or occurrence of failure of the silicone materials, with consequent adverse effect on the efficiency or utility of the structure in which such materials are employed. In such applications, a silicone possessing soft, gel-like texture and accompanying flexibility would better serve the functional performance and physical property requirements for usage of silicone materials.

Accordingly, it would be a significant advance in the art to provide a photocurable silicone gel composition which can be made without highly toxic reagents in a relatively simple and economic manner, does not require filtering of a viscous polymer product, and comprises a silicone polymer which is capped with an acrylic-functional capper having no β-oxygenated silicon linkages in its structure.

With respect to the photocurable silicone gel composition, precursor thereof, and process of making same which constitute aspects of the present invention and are more fully described hereinafter, related art to the present invention is discussed below.

"Synthesis of Organosilicon Esters of Hydrozino Carboxylic Acids," G. S. Gol'din, et al, *Zhurnal Obshchei Khimii*, Vol. 43, No. 4, April, 1973, pp. 781–784, discloses the synthesis of 1,3-bis[(acryloyloxy)methyl]- and 1,3-bis[(methacryloyloxy)-methyl]-1,1,3,3-tetramethyldisiloxanes by heating mixtures of chloro(-chloromethyl)dimethylsilane with acrylic and methacrylic acids in the presence of triethylamine as hydrogen chloride acceptor, with subsequent hydrolysis of the silyl ester:

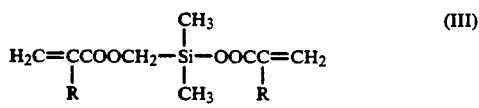

wherein R=H or CH$_3$.

U.S. Pat. No. 4,845,259 to M. Arai, et al, assigned to Shin-Etsu Chemical Company, Ltd., and Shin-Etsu's Japanese Kokai Tokkyo Koho JP 01 14226, JP 63 179881, JP 63 185989, and European Patent Application EP 276986, describe the synthesis of a silyl acrylic acid diester of formula (III) above, by reacting potassium or sodium salts of acrylic acid with chloromethyldimethylchlorosilane. Such synthesis, however, has the disadvantage that the acrylic acid salts employed therein are relatively expensive. In accordance with the teachings of these patents, the silyl diacrylate compound (III) is hydrolyzed to form a silanol capper of the formula:

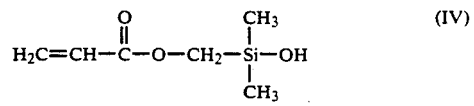

Contemporaneously, dimethylchlorosilane is reacted, in the presence of a platinum hydrosilation catalyst, with a vinyl-terminated dimethylsiloxane polymer to yield a product silicone polymer with chloro terminal groups. The silicone polymer is reacted with the silanol capper in the presence of amine to yield an acryloxymethyl-terminated polymer of the formula:

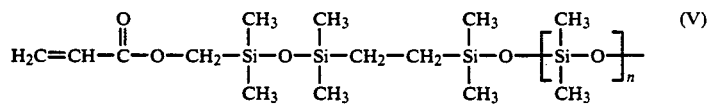

and thereafter the product is filtered to remove the concurrently formed amine hydrochloride complex therefrom.

U.S. Pat. No. 4,563,539 to G. A. Gornowich, et al describes UV-curable acrylofunctional silicones which are formed by reaction of aminoalkyl or diaminoalkyl silicones with isocyanato acrylates.

Other relevant acrylic functional silicone references include: U.S. Pat. No. 4,503,208 (preparation of acrylate and 2-alkyl acrylate silicones which are curable by UV exposure, heat, or anaerobic conditions, by hydrosilation of an acrylate or 2-alkyl acrylate ester of an acetylenic alcohol with silicon hydride functional silicones); U.S. Pat. No. 4,575,546 (radiation-curable silicone polymers with a plurality of acrylic groups clustered at or near the chain ends thereof); U.S. Pat. No. 4,575,545 (same); U.S. Pat. No. 4,675,346 (silicone resin with terminal acrylic groups and intermediate region free of acrylic groups, formulated with fumed silica filler and photoinitiator, and curable by UV radiation); U.S. Pat. No. 4,504,529 (graft polymers having o-alkyl acrylate functionality, formed as a reaction product of a silicon hydride grafting agent with at least one o-alkyl acrylate group, and an aliphatically unsaturated polymer, e.g., a polyorganosiloxane); and U.S. Pat. No. 4,655,147 (methacrylated siloxanes prepared by hydrosilation of beta-(allyloxy)ethylmethacrylate using a silicon hydride functional siloxane).

Photocurable siloxane rubber compositions are described in Japanese Kokai Tokkyo Koho JP 01 301708, and European Patent Application 0 240 162 A2 describes liquid polyorganosiloxane compositions that cure by a hydrosilation reaction to yield optically transparent elastomers.

Accordingly, it is an object of the present invention to provide a photocurable silicone gel composition and precursor thereof which may be synthesized using relatively low cost, readily available materials, which are relatively simple in synthesis procedure, and which avoid the necessity of filtering a highly viscous silicone polymer product to remove by-products therefrom.

It is another object of the invention to provide a photocurable silicone composition in which the silicone polymer is free of β-oxygenated silicon linkages, and whose synthesis can be carried out without highly toxic reactant materials.

Other objects and advantages will be more fully apparent from the ensuing disclosure and appended claims.

SUMMARY OF THE INVENTION

In one aspect, the present invention relates to a silicone composition, comprising:

(i) a first silane of the formula:

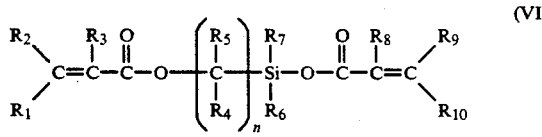

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4;

(b) a second silane of the formula:

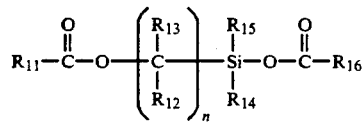

wherein:

$R_{11}$ and $R_{16}$ are non-polymerizable groups and are independently selected from halo and organo radicals;

$R_{12}$, $R_{13}$, $R_{14}$, and $R_{15}$ are independently selected from hydrogen, halo, and organo radicals; and (c) a polysiloxane having at least two functional groups per molecule with which said first and second silanes are cappingly reactive;

wherein: (1) the first and second silanes together are provided in sufficient quantity relative to the polysiloxane to react with substantially all (i.e., 90%.) of the cappingly reactive functional groups of the polysiloxane, and (2) the first silane constitutes from about 50% to about 98% by weight of the total weight of the first and second silanes.

Preferably, the first and second silanes together are provided in sufficient quantity relative to the polysiloxane to react essentially completely therewith, i.e, with at least 98% of the cappingly reactive functional groups of the polysiloxane, and the first silane constitutes from about 70% to about 90% by weight of the total weight of the first and second silanes.

In a specific aspect, the functional groups of the polysiloxane which are cappingly reactive with the first and second silanes, may for example comprise functionality selected from the group consisting of:

—OH;

—N(R')$_2$, wherein each of the R' substituents is independently selected from hydrogen and organo groups, with the proviso that at least one R' substituent is hydrogen;

—SH;

—SO$_3$H; and where residual acrylic acid groups are present,

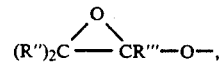

wherein each of the R" and R'" substituents is independently selected from hydrogen and organo groups.

In a particularly preferred aspect, the first silane comprises a silyl diacrylate having the formula:

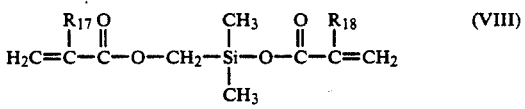

wherein:

$R_{17}$ and $R_{18}$ are independently selected from H and methyl;

and the polysiloxane comprises a linear polydimethylsiloxane with terminal —OH groups.

A further aspect of the present invention relates to a photocurable silicone gel composition formed by reacting the silicone composition broadly described above, viz., the first and second silanes (a) and (b), respectively, with the polysiloxane (c). Such reaction may for example be carried out at a reaction temperature of from about 0° C. to about 100° C., and preferably the reaction is conducted at ambient temperature, e.g., room temperature.

The reaction may be carried out for a selected time period to suitably cap the silane. This time period will depend on the temperature of the reaction mixture, but generally it is in the range of 0.3 to 4 hours. The reaction may be carried out in any suitable diluent or reaction medium such as a hydrocarbon or halohydrocarbon, e.g., heptane. The resulting photocurable silicone gel composition by exposure to curingly effective radiation is cured to produce a soft silicone gel. For the purpose of effecting such cure, the photocurable silicone gel composition may be formulated with a suitable photoinitiator as appropriate to the specific curingly effective radiation (e.g., ultraviolet (UV) radiation) which is employed.

Another aspect of the present invention relates to a cured silicone gel material produced by photocuring the above-described photocurable silicone gel composition, under conditions photocuringly effective therefor.

In another, more general aspect, the present invention relates to a silicone composition, comprising:

(a) a silane of the formula:

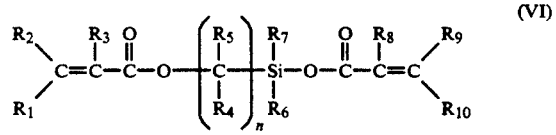

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4;

(b) a non-acrylic capper; and (c) a polysiloxane having functionality which is reactive with the silane (a) and the non-acrylic second capper (b);

whereby the reactive functionality of the polysiloxane is partially cappable by said silane, and partially cappable by said second capper.

These components (a), (b), and (c) may be reacted to yield a photocurable silicone gel composition, which is curable by curingly effective radiation, optionally in the presence of a suitable photoinitiator, to form a product silicone gel.

Still another aspect of the invention relates to a method of making a photocurable silicone gel composition, comprising reacting:

(a) a first silane of the formula:

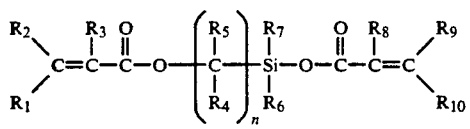

(VI)

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4;

(b) a second silane of the formula:

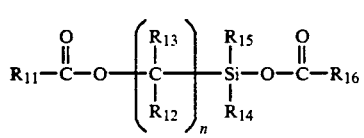

(VII)

wherein:

$R_{11}$ and $R_{16}$ are non-polymerizable groups and are independently selected from halo and organo radicals;

$R_{12}$, $R_{13}$, $R_{14}$, and $R_{15}$ are independently selected from hydrogen, halo, and organo radicals; and n is an integer of from 1 to 4; and (c) a polysiloxane having at least two functional groups per molecule with which the first and second silanes are cappingly reactive;

wherein the first and second silanes together are present in sufficient quantity relative to the polysiloxane, to react with substantially all of the cappingly reactive functional groups of the polysiloxane, and with the first silane constituting from about 50% to about 98% by weight of the total weight of the first and second silanes.

A further aspect of the invention relates to a method of forming a cured silicone gel, comprising subjecting the above-described silicone gel composition to curingly effective radiation for sufficient time to form a cured silicone material.

Other aspects and features of the present invention will be more fully apparent from the ensuing disclosure and appended claims.

DETAILED DESCRIPTION OF THE INVENTION, AND PREFERRED EMBODIMENTS THEREOF

The photocurable composition of the present invention is based on the surprising and unexpected discovery that acrylic-functional capper compounds of the formula:

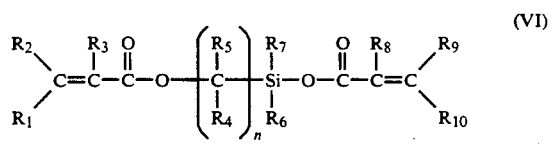

(VI)

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4, may be used to cap silanol or other active hydrogen-containing functionality on silicone polymers, by simply mixing the capper with the silicone polymer for a relatively short period of time, e.g., 20 minutes to 4 hours, at ambient or relatively low elevated temperature, e.g., 100° C., preferably at ambient or room temperature.

For ease of reference in the ensuing discussion, the acrylic functional capper of formula (VI) above will sometimes hereinafter be denoted as the "silyl diacrylate compound", the "first silane", the "first silane capper", or the "silyl diacrylate capper".

The highly efficient reaction of the silyl diacrylate capper with a silanol-ended silicone polymer is very surprising. It is generally perceived that monoacetoxysilanes at best will react with silanols only very sluggishly. It therefore is particularly unexpected that end-capping with the silyl diacrylate capper can take place at room temperature. Indeed, in the patent references of Shin-Etsu Chemical Company, Ltd., which were discussed hereinabove in the "Background of the Invention" section hereof, it is not even contemplated that such a facile reaction could take place. Instead, these references teach to hydrolyze the silyl diacrylate capper to prepare a silanol compound, contemporaneously with hydrosilylating a vinyl silicone polymer with a chloromethylsilane compound to yield a chloro-terminated silicone polymer which then is reacted with the silanol compound to yield an acrylic functionality-terminated silicone polymer. This extensive and circuitous synthetic route to achievement of an acrylic functionality-terminated silicone polymer is based on the aforementioned general perception that monoacetoxysilanes will at best react with silanols only very sluggishly, and points up the substantial and unobvious character of the simple, economic methodology used for making a photocurable silicone in the broad practice of the present invention.

The silyl diacrylate capper may suitably be formed by the reaction of a chlorosilane compound and acrylic acid, and may subsequently be employed to form a photocurable silicone composition by reacting (1) the silyl diacrylate capper and (2) a second, non-acrylic capper, perferably another silane capper which is non-acrylic in character (sometimes hereinafter referred to as "the second silane"), with (3) a silicone having functionality which is reactive therewith, to yield an acryloxy-functional capped silicone, which then is curable by curing conditions comprising radiation exposure, in the presence of a photoinitiator if required.

Among acrylic capper compounds of the general formula (VI) set out broadly hereinabove, a particularly preferred class of such compounds includes those in which $R_1$, $R_2$, $R_3$, $R_4$, $R_5$, $R_8$, $R_9$, and $R_{10}$ are independently selected from hydrogen, halo, and $C_1$-$C_8$ alkyl radicals, and $R_6$ and $R_7$ are independently selected from hydrogen, halo, $C_1$–$C_8$ alkyl, and phenyl. In this preferred class of compounds, n may have a value of 1 to 2, and most preferably n is 1.

When n is 2, the silyl diacrylate capper is a β-oxygenated silicon compound. As mentioned hereinabove, β-oxygenated silicon compounds have a susceptibility to undergoing β-elimination reaction, but despite this potential occurrence, β-oxygenated silyl diacrylate cappers of the present invention nonetheless are markedly superior to prior art β-oxygenated silicon capper compounds (e.g., the prior art capper compound of formula (I) described in the "Background of the Invention" section hereof) with respect to their ease of synthesis, and the economic advantages and time savings associated therewith. In any event, to minimize stability problems, n in the silyl diacrylate capper compounds of the present invention may suitably have a value of 1, 3, or 4.

A more specific class of preferred compounds of formula (VI) above includes compounds in which: $R_1$, $R_2$, $R_9$, and $R_{10}$ are hydrogen; $R_3$, $R_4$, $R_5$, and $R_8$ are independently selected from hydrogen and $C_1$–$C_8$ alkyl; $R_6$ and $R_7$ are independently selected from $C_1$–$C_8$ alkyl and phenyl; and n is 1.

A highly preferred silyl diacrylate capper in the practice of the present invention is the silyl diacrylate of the formula:

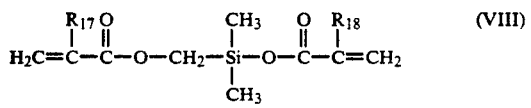

wherein $R_{17}$ and $R_{18}$ are independently selected from H and methyl.

The so-called second silane referred to above may have the formula:

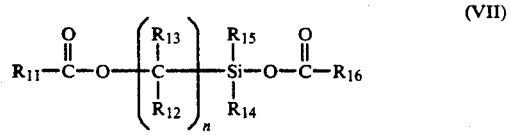

wherein:
  $R_{11}$ and $R_{16}$ are non-polymerizable groups and are independently selected from halo and organo radicals;
  $R_{12}$, $R_{13}$, $R_{14}$, and $R_{15}$ are independently selected from hydrogen, halo, and organo radicals; and
  n is an integer having a value of from 1 to 4.

In the second silane of the above general formula, $R_{11}$ and $R_{16}$ more preferably are independently selected from hydrocarbyl, fluorocarbyl, and fluorohydrocarbyl. By way of example, $R_{11}$ and $R_{16}$ may suitably be organo radicals containing from 1 to 8 carbon atoms, and most preferably are independently selected from $C_1$–$C_8$ alkyl radicals. Preferably, $R_{12}$, $R_{13}$, $R_{14}$, and $R_{15}$ are independently selected from hydrogen, lower ($C_1$–$C_8$) alkyl, and phenyl, and most preferably $R_{12}$ and $R_{13}$ are hydrogen, and $R_{14}$ and $R_{15}$ are methyl.

A highly preferred second silane capper has the formula:

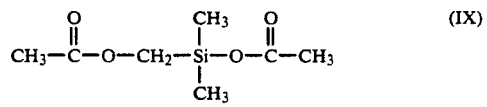

Although the second silane described above is a preferred additional capper employed in combination with the silyl diacrylate capper, to cap the functional sites on the silicone which are reactive therewith, it will be appreciated that the invention may broadly be practiced utilizing second capper species other than the second silane capper illustratively discussed hereinabove.

The purpose of the second capper is to cap a portion of the cappable reactive sites on the silicone, so that only part of the cappable sites are capped with the silyl diacrylate capper. In other words, a portion of the cappable sites on the silicone is capped with the silyl diacrylate capper, and a portion is capped with the second capper. By this less-than-complete capping with the silyl diacrylate capper, the resulting silicone when photocured will exhibit an increased softness and gelatinous character, relative to a corresponding silicone which is fully capped with the silyl diacrylate capper.

It may also be feasible in some instances to cap the silicone with only a silyl diacrylate capper of the type described above, but to carry out the capping with an equivalents ratio of the capping acryloxysilyl functionality (i.e., capping moieties derived from the silyl diacrylate capper) to the acryloxy-reactive functionality of the silicone, of less than 1.0, so that some of the acryloxy-reactive functionality on the silicone remains uncapped. Photocurable silicone compositions capped only with the silyl diacrylate capper are more fully disclosed and claimed in co-pending U.S. patent application Ser. No. 07/615,200 filed concurrently herewith in the names of Hsien-Kun Chu, Robert P. Cross, and David I. Crossan, the disclosure of which hereby is incorporated herein by reference.

In general, however, when a softened photocured composition is desired, it is preferred to cap all of the acryloxy-reactive functionality of the silicone, in part with the silyl diacrylate capper, and in part with a second capper, rather than providing only the silyl diacrylate capper (acryloxysilyl functionality) in a less than 1.0 equivalents ratio relative to the reactive functionality of the silicone. The reason for this preference is that if reactive, uncapped functionality remains on the silicone, it may undesirably give rise to a second curing modality, e.g., moisture cure, which may yield physical properties approaching those of the corresponding fully acrylic-capped silicone, when a softer (lower durometer hardness) material is desired as the final cured product. Polymodal-curing silicone compositions utilizing partial capping of silicones with the silyl diacrylate capper are more fully disclosed and claimed in co-pending U.S. patent application Ser. No. 07/615,185 filed concurrently herewith in the names of Edward K. Welch, II, Robert P. Cross, David I. Crossan, and Hsien-Kun Chu, the disclosure of which hereby is incorporated herein by reference.

Thus, the second capper may comprise various organocarboxy capper species of formula (VII) above, as well as any other suitable capper compounds which are reactive with the functionality of the polysiloxane which also is reactive with the silyl diacrylate capper.

In the broad practice of the present invention, the silyl diacrylate, or first silane capper, may suitably comprise a mixture of various compounds within the general formula of (VI) above, and the second capper may likewise comprise a mixture of silane compounds of the general formula (VII) above.

Concerning the functional groups of the polysiloxane which are cappingly reactive with the first and second silane cappers, such functional groups may include any suitable functionality which is reactive with the first and second silanes to provide a resulting photocurable silicone gel composition. The silicone functionality which is reactive with the acryloxy functionality of the silyl diacrylate compound may be located in any appropriate part of the silicone molecule, e.g., as a terminal functionality on a linear silicone backbone, as an end group on a siloxy side-chain, or otherwise within the structure of the silicone. Correspondingly, the silicone functionality which is reactive with the acryloxy functionality of the silyl diacrylate compound, may be bonded to any suitable atom or moiety in the silicone molecule, e.g., to a silicon atom, or to another atom or group in the molecule, e.g., a hydrocarbon bridging group which in turn is joined to a silicon atom. In a preferred aspect, the silicone functionality which is reactive with the acryloxy functionality of the silyl diacrylate compound, comprises a silicon-bonded functional group including a labile hydrogen constituent, with the proviso that such functional group is not hydrogen per se. Illustrative of potentially suitable functional groups for the polysiloxane constituent of the composition are the following functional groups:

—N(R')$_2$, wherein each of the R' substituents is independently selected from hydrogen and organo groups, with the proviso that at least one R' substituent is hydrogen;

—SH; and

—SO$_3$H.

In instances where residual acrylic acid functional groups are present with the silyl diacrylate capper, deriving from the synthesis of such capper, the cappable polysiloxane functionality may be constituted by a silicon-bonded functionality of the formula:

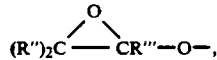

wherein each of the R" and R''' substituents is independently selected from hydrogen and organo groups.

Preferably, the cappable reactive functionality of the polysiloxane is hydroxyl.

It will be recognized that the foregoing species of functionality for the polysiloxane are illustrative only and that any other functional groups which are reactive with the capper species employed, which are compatible with the constituents of the formulation in which the capped polysiloxane ultimately is used, and which do not preclude the utility of the resulting photocurable silicone gel composition for its intended purpose, may advantageously be employed.

The polysiloxane which is reacted with the first and second cappers may suitably comprise a linear polydiorganosiloxane, or other linear silicone, having a weight average molecular wight which may for example range from about 700 to about 300,000, preferably from about 10,000 to about 80,000, and most preferably from about 10,000 to about 50,000.

Although the polysiloxane which is reacted with the first and second cappers to form the capped photocurable silicone gel composition of the invention is preferably linear in conformation, other non-linear silicones, e.g., branched, cyclic, or macromeric, may potentially usefully be employed in the broad practice of the present invention. Preferably, the polysiloxane is predominantly linear in character.

The cappable functionality which is reactive with the first and second silane cappers may be located in any suitable position on the polysiloxane molecule, including terminal positions in linear polysiloxane molecules, or terminal positions of chains of siloxy units in the polysiloxane molecule, as well as pendant functionality positions and positions in intermediate or interior moieties of the molecule, but preferably the polysiloxane comprises terminal reactive functional groups, and most preferably, the polysiloxane is a linear molecule both of whose terminal functional groups are cappingly reactive with the first and second cappers, e.g., terminal hydroxy groups. Thus, for example, the polysiloxane material may comprise a hydroxy-terminated polydiorganosiloxane, e.g., a hydroxy-terminated polydimethylsiloxane. Preferably, the starting polysiloxane material is a polydiorganosiloxane whose organo substituents are predominantly methyl. A particularly preferred polysiloxane material which has been usefully employed in the practice of the present invention is a hydroxy-terminated polydimethylsiloxane of linear configuration, having a weight average molecular weight on the order of about 28,000.

As mentioned, the polysiloxane comprising the above-described functionality may be macromeric in character. The polysiloxane thus may comprise polysiloxane resins having M, D, T, and/or Q siloxy units, with at least two cappingly reactive (cappable) sites per molecule.

As used in the preceding paragraph, the terms M, D, T, and Q siloxy units refer to monofunctional, difunctional, trifunctional, and tetrafunctional siloxy units, respectively, as defined in U.S. Pat. No. 4,568,566 to L. A. Tolentino, at column 5, lines 51–55 thereof.

In the reaction of the polysiloxane with the first and second silanes, the polysiloxane is capped with acryloxy functionality deriving from the first silane, while concurrently the polysiloxane is capped by functionality, e.g., acetoxy functionality, deriving from the second silane.

For example, when acryloxymethyldimethylacryloxysilane is employed as the first silane, the capping moiety resulting therefrom is an acryloxymethyldimethylsiloxy functional group, and when acetoxymethyldimethylacetoxysilane is employed as the second silane, the capping moiety resulting therefrom is an acetoxymethyldimethylsiloxy group.

In general, any suitable ratio of the first and second silanes relative to one another may be employed, depending on the ultimate physical properties and end use application desired for the silicone gel produced by photocuring the photocurable composition. The second silane provides a capping moiety on the polysiloxane which does not contribute to the polymerizability of the polysiloxane, in contrast to the first silane, which caps the polysiloxane to provide an acryloxy functionality by means of which the polysiloxane is rendered polymerizable under photocuring conditions. Thus, with respect to the available "cappable" sites on the polysiloxane molecule, an increasing concentration of the second silane relative to the first silane will produce a progressively softer silicone gel when the capped composition is polymerized. In this manner, the second silane serves to functionalize the polysiloxane with "inert" or non-polymerizable capping moieties.

If all of the available capping sites on the polysiloxane are capped with acryloxy functionality deriving from the first silane, the resulting silicone composition when cured produces a very hard, physically tough, polymerized silicone product. Conversely, if all of the capping sites on the polysiloxane are capped by the second silane, then no polymerization of the polysiloxane will be effected under photocuring conditions, and the material will be and remain fluid in character. Intermediate these two extremes, the polysiloxane will be increasingly softened with respect to its final cured product as the proportion of its capping sites occupied by capping moieties derived from the second silane increases, relative to the number of capping sites on the polysiloxane which are occupied by acryloxy capping functionality deriving from the first silane.

As a further specific illustration of the variation in physical properties of the cured silicone associated with changes in the relative proportions of the first and second silanes, using a 28,000 weight average molecular weight silanol-terminated linear polydimethylsiloxane as the resin to be capped, a polysiloxane of such type when fully endcapped with acryloxy functionality has a durometer (00) hardness value after the material is photocured which is on the order of 75. By contrast, a polysiloxane starting material of the same type, when approximately half of the cappable sites on the polysiloxane molecule are capped with acryloxymethyldimethylsiloxy functionality, deriving from acryloxymethyldimethylacryloxysilane as the first silane capper, and half with acetoxymethyldimethylsiloxy functionality, deriving from acetoxymethyldimethylacetoxysilane as the second silane ("inert") capper, yields a capped silicone which is a very soft gel and which probably has a durometer (00) hardness value of 5 or less when photocured. Intermediate these relative capping concentrations, with acryloxy functionality capping levels on the order of 75% of the available capping sites on the polysiloxane molecule, and the remaining 25% of such sites being occupied by capping moieties deriving from the inert capper (second silane), the durometer (00) hardness may be on the order of 15-25.

It will be apparent from the foregoing that the physical properties of the capped silicone when photocured may be varied widely by changing the relative amounts of the first and second silanes which are employed to cap the silicone. Thus, the amount of each capper which is employed in a given application will depend on the specific end use of the photocured material, and the specific chemical compositions of the cappers and the polysiloxane which are employed. The relative amounts of the cappers which are required for any specific application may readily be determined by the skilled artisan without undue experimentation, by simple tests involving variation of the relative amounts of the two cappers and subsequent measurement of the cured properties of the appertaining composition.

In general, the requisite softening of the cured polysiloxane material, in applications such as conformal coatings, sealants, potting applications, and the like, may be achieved with relative amounts of the first silane (acrylic capper) to the second silane (inert capper) of from about 50% to about 90% by weight of the first silane, based on the total weight of the first and second silanes, and with the total amount of first and second silanes being stoichiometrically adequate to effect substantially full capping of the available capping sites on the polysiloxane molecule.

Preferably the (first silane)/(first silane+second silane) weight ratio is from about 0.5 to about 0.98, and most preferably from about 0.7 to about 0.9. Correspondingly, in the capped polysiloxane, it is preferred that the equivalents ratio of the capping functionality derived from the first silane to the total capping functionality derived from the first and second silanes with which the polysiloxane is capped, is from about 0.50 to about 0.98, and most preferably from about 0.70 to about 0.90.

Preferably, at least a stoichiometric (total) amount of the two cappers (first silane and second silane) is employed with the polysiloxane, and most preferably, a slight stoichiometric excess of the two cappers is employed to ensure full capping of the available sites on the polysiloxane.

In such manner, the first and second silanes together are provided in sufficient quantity relative to the polysiloxane to react with substantially all (i.e., at least 90%) of the cappable reactive functional groups (reactive sites) of the polysiloxane, and most preferably the capping of such functional groups of the polysiloxane is essentially complete, i.e., at least 98% of such sites are capped.

The capping reaction takes place relatively rapidly (e.g., from about 0.1 to about 4 hours) at ambient (room temperature) conditions, and such ambient conditions are preferred to avoid the requirement of heating the reaction mixture (comprising the first and second silanes and the polysiloxane) to yield the photopolymerizable silicone gel composition. Generally, however, the reaction may be usefully conducted at temperatures in the range of from about 0° C. to about 100° C., with higher temperatures within such range being usefully employed to effect removal of any acrylic acid produced in the synthesis.

Although the invention has been described hereinabove with particular reference to capping of a cappable polysiloxane (silicone) with (1) a silyl diacrylate capper (first capper) and (2) a second capper, which may for example comprise acetoxymethyldimethylacetoxysilane, or other silyl diester compound, it will be appreciated that such description is illustrative only, and that other capping moieties may be used in the broad practice of the present invention. For example, the capper may comprise a single silane compound having both acryloxy and acetoxy functionality, whereby the silicone is difunctionally capped with acryloxy and acetoxy moieties using a single capper compound.

Further, a silicone gel composition may be advantageously synthesized in some applications by fully capping the silicone with a silyl diacrylate capper, followed by reaction of a portion of the resulting acryloxy capping moieties with a less than stoichiometric amount of a co-reactant, yielding a reaction product capping moiety which is non-polymerizable in character.

As a further alternative, it may be advantageous in some applications to cap a portion of the reactive sites on the silicone with a silyl diacrylate compound, and to cap the remaining reactive sites with more than one "inert", or non-polymerizable, capper species. What is required in each instance, regardless of the synthesis methodology, is the provision of a photocurable silicone having only a portion of its cappable sites capped with polymerizable acrylic functionality.

Thus, in addition to capping with the first and second silanes, or other first (acrylic) and second (non-acrylic) cappers, the silicone molecule may be further functionalized in any suitable manner to provide for additional curing modalities (i.e., additional (partial) cure capability, such as by heat cure, anaerobic cure, moisture cure, etc.), over and above the radiation curability imparted by the acryloxy functionality in the capped silicone. Polymodal curing, multifunctionalized silicone compositions are described in co-pending U.S. application Ser. No. 07/615,185 filed concurrently herewith in the names of Edward K. Welch, II, R. P. Cross, D. I. Crossan, and H. K. Chu for "POLYMODAL-CURE SILICONE COMPOSITION AND METHOD OF MAKING THE SAME," the disclosure of which is hereby incorporated herein by reference.

Thus, while the ensuing discussion will be directed to capping of silicones with first and second silanes as also illustratively described hereinearlier, it will be recognized that the variants just described may likewise be employed in the broad practice of the invention.

After being polyfunctionalized by capping with the first and second silanes, the acryloxy-functional capped silicone may be suitably combined with an effective amount of a photoinitiator for curing of the acryloxy-functional capped silicone under photoinitiating curing conditions. The polyfunctionalized silicone and the photoinitiator may also be formulated with any compatible and efficacious curatives, other initiators, accelerators, etc., as appropriate to the character of the desired silicone gel produced by photocuring of the composition.

The photoinitiator may comprise any photoinitiator known in the art which is effective to cause curing of acrylic functionalities. These include photoinitiators such as benzoin, substituted benzoins such as benzoin ethyl ether, benzophenone, benzophenone derivatives, Michler's ketone, dialkoxyacetophenones such as diethoxyacetophenone, acetophenone, benzil, and other derivatives (substituted forms) and mixtures thereof. A particularly preferred photoinitiator material is diethoxyacetophenone. Although any suitable effective amount of photoinitiator may be employed in the photocurable silicone compositions of the invention, generally the photoinitiator concentration will usefully be in the range of about 0.1% to about 10% by weight, and more specifically and preferably from about 0.2% to about 5% by weight, based on the weight of the acrylic functionality-capped silicone.

The photoinitiator employed in the photocurable silicone compositions of the present invention may also be polymer bound. Such photoinitiators are described in U.S. Pat. Nos. 4,477,326 and 4,587,276. Other free radical initiators, such as peroxy thermal initiators may be used in some of the lower molecular weight silicone formulations of the invention.

The compositions of the invention may also include other ingredients to modify the cured or uncured properties of the photocurable silicone gel compositions, as necessary or desired for specific end uses.

Fillers or reinforcing materials may usefully be employed in compositions of the present invention to provide enhanced mechanical properties, and in some instances enhanced UV radiation curability of the composition. Among preferred fillers are reinforcing silicas. The reinforcing silicas are fumed silicas which may be untreated (hydrophilic) or treated so as to render them hydrophobic in character.

In general, fillers may be employed at any suitable concentration in the curable silicone composition, but generally are present at concentrations of from about 5% to about 45% by weight, based on the weight of the capped polyfunctionalized silicone. Generally, any other suitable mineralic, carbonaceous, glass, or ceramic fillers may be potentially advantageously employed. Examples include ground quartz, tabular alumina, diatomaceous earth, silica balloons, calcium carbonate, carbon black, titanium oxide, aluminum oxide, aluminum hydroxide, zinc oxide, glass fibers, etc.

In addition, the radiation-curable silicone compositions may also optionally contain an adhesion promoter, to enhance the adhesive character of the composition for a specific substrate (e.g., metal, glass, ceramic, etc.), when the composition is employed as an adhesive for bonding, or as a sealant for sealing, of substrate elements. Any suitable adhesion promoter constituents may be employed for such purpose, depending on the specific substrate elements employed in a given application. For example, the adhesion promoter might be selected to enhance adhesion of the composition on substrates comprising materials such as metals, glasses, plastics, ceramics, and mixtures, blends, composites, and combinations thereof. Various organosilane compounds may be usefully employed for such purpose, and such compounds may also desirably feature oxirane functionality, as well as silicon-bonded alkoxy substituents, to provide broad adhesive bonding utility. In such organosilane compounds, the oxirane functionality may be provided by a glycidoxyalkyl substituent on a silicon atom of the silane compound. A particularly preferred adhesion promoter of such type is glycidoxypropyltrimethoxysilane.

In addition, further additives such as MQ or MDQ resins can be incorporated, to vary the properties of the silicone composition as desired.

Besides the constituents identified above as being optionally includable in the photocurable silicone gel compositions of the present invention, further optional constituents include: anti-oxidants; flame retardants; pigments; etc.; as well as filler adjuvants, e.g., filler-treating agents such as hydroxy-terminated vinylmethylsiloxane for filler treatment of quartz or similar fillers when used in the composition.

It is within the purview of the present invention to utilize a capped silicone gel composition which is functionalized for UV radiation exposure curing, in combination with other formulation constituents which cure by some other curing modality, e.g., moisture curing, heat curing, anaerobic curing, etc. Thus, physical blends of different materials having different curing modalities are contemplated, as well as use of a photocurable silicone gel material alone.

The photocurable silicone gel compositions of the present invention may be photocured by exposure to any radiation conditions which are curingly effective for the composition. Suitable radiant energy types which may be usefully employed include electron beam radiation, ultraviolet radiation, visible light radiation, gamma radiation, X-rays, $\beta$-rays, etc. Preferably, the photocuring radiation is actinic radiation, i.e., electromagnetic radiation having a wavelength of about 700 nm or less which is capable of effecting the cure of the silicone composition. Most preferably, the photocuring radiation comprises ultraviolet (UV) radiation.

Curing may suitably be carried out in an ambient atmosphere or in an inert atmosphere such as argon or nitrogen. Exposure time required to cure the applied composition varies with such factors as the particular formulation used, type and wavelength of radiation, energy flux, concentration of photoinitiator, and thickness of the coating, but it generally is quite short, that is, less than about 3 minutes. Exposing the composition to excessive amounts of radiation may "overcure" the composition, resulting in poor physical and performance properties. The amount of radiation which is excessive varies with the given formulation, coating thickness, radiation source, etc., and may easily be determined by the skilled artisan without undue experimentation.

The depth of radiation penetration in the silicone composition will depend on the constituents, fillers, and other compositional factors. Generally, in filled silicone compositions, the depth of radiation penetration is on the order of about 120 mils when ultraviolet light is used as the radiant medium.

In some instances, it may be feasible to photocure (radiation cure) the silicone composition without any constituent photoinitiator therein, however it is generally desirable to utilize a photoinitiator to initiate the curing of the acryloxy-functional capped silicone by substantial polymerization thereof.

In the preferred synthesis of the acryloxy-functional siloxane employed in the broad practice of the invention, the following sequence of reaction steps is carried out:

(a) reacting (i) an acrylic acid compound of the formula:

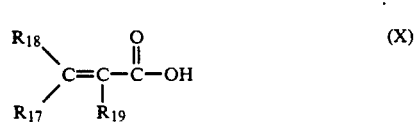

wherein:
R$_{17}$, R$_{18}$, and R$_{19}$ are independently selected from hydrogen, halo, and organo radicals, with (ii) a chlorosilane compound of the formula:

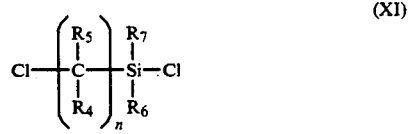

wherein:
R$_4$, R$_5$, and R$_6$ and R$_7$ are independently selected from hydrogen, halo, and organo radicals; and n is an integer of from 1 to 4;
optionally in the presence of (iii) a basic hydrogen chloride acceptor,
to yield a silyl diacrylate compound of the formula:

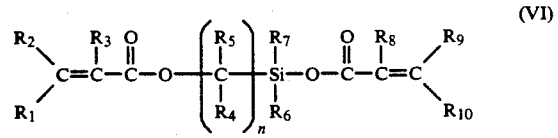

wherein:
R$_1$, R$_2$, R$_3$, R$_4$, R$_5$, R$_6$, R$_7$, R$_8$, R$_9$, and R$_{10}$ are independently selected from hydrogen, halo, and organo radicals; and n is an integer having a value of from 1 to 4.

The silyl diacrylate compound then is reacted with a silicone having functionality which is reactive with an acryloxy functionality of the silyl diacrylate compound, to thereby cap the silicone with acryloxy functionality. The silicone also is reacted with a second silane to functionalize the silicone with inert (non-polymerizable) functionality. These respective capping steps may be carried out concurrently or in any suitable sequence to yield the capped polyfunctional silicone as product.

It will be appreciated that the acrylic acid component employed in the above-described reaction scheme may comprise a mixture of compounds each of the general formula (X), e.g., a mixture of acrylic acid and methacrylic acid. Likewise, the chlorosilane co-reactant may be a mixture of chlorosilane species each of the general formula (XI) above, e.g., a mixture of chloromethyldimethylchlorosilane and chloromethyldiphenylchlorosilane. In such instances, the product silyl diacrylate will likewise comprise a mixture of corresponding differently substituted silyl diacrylate compound species.

It may also be desirable in some instances to carry out the acrylic acid/chlorosilane reaction so as to form a difunctional capper containing both acryloxy functionality and other, "inert" functionality. For example, the reaction may be carried out using a mixture of acrylic acid and acetic acid for reaction with the chlorosilane, whereby the reaction product will include diacrylate capper of the general formula (VI) above, as well as capper compounds containing two acetoxy functionalities and capper compounds containing both acetoxy and acryloxy functionality in the same molecule. In this manner, it is possible to use the reaction product silane cappers in mixture with one another to polyfunctionalize the silicone in accordance with the present invention.

Generally, and preferably, the reaction of the acrylic acid compound and the chlorosilane compound is conducted in a diluent medium, preferably a non-reactant hydrocarbon or halohydrocarbon, e.g., heptane, Generally, and preferably, the reaction volume is stirred during the reaction, such as may be accommodated by the provision of mechanical mixing means in the reaction vessel.

In carrying out the reaction of the acrylic acid compound with the chlorosilane compound, it is generally advantageous to use a base such as triethylamine to function as a hydrogen chloride acceptor, thereby removing the hydrogen chloride formed in the reaction. The resulting hydrogen chloride/amine complex may then be filtered to remove the complex from the reaction mixture. In some instances, it may be feasible to remove the hydrogen chloride by-product by sparging the reaction mixture with nitrogen, whereby the passage of nitrogen gas through the mixture removes the hydrogen chloride.

The reaction may be carried out at any suitable temperature; generally, temperatures on the order of from about 25° C. to about 100° C. are usefully employed, and preferably from about 25° C. to about the reflux temperature of the diluent medium in which the reaction is carried out, e.g., about 100° C. for heptane as the diluent medium. The time required to carry out the reaction may be readily determined for a given reaction system by simple analytical tests without undue experimentation, and the reaction time may be varied as necessary or desirable in a given application. By way of example, the reaction may be carried out in approximately 3-4 hours in a diluent medium of heptane at reflux temperatures. After the reaction has been carried out, the reaction mixture may optionally be subjected to vacuum stripping or other suitable treatment to effect removal of any residual (acrylic) acid constituents.

It will be appreciated that the synthesis methodology described above achieves a substantial advance in the art over the prior art practice of acrylic capping a silicone by reacting it with an isomeric mixture of acryloxypropenyldimethylchlorosilanes, as described hereinabove in the "Background of the Invention" section hereof. In that prior art synthesis, the generation of hydrochloric acid necessitates the addition of an amine in the process to function as the acid acceptor, resulting in a complexed amine hydrochloride solid which then must be filtered from the viscous capped silicone polymer, a step which is time-consuming, difficult, and costly. By contrast, in the practice of the present invention, the synthesis of the acrylic capper per se is associated with the generation of hydrogen chloride, which then becomes base amine complexed in the reaction mixture. However, in contrast to the filtration of the capped polymer which is required by the prior art synthesis method, the amine-complexed hydrogen chloride solid in the practice of the present invention may readily be removed by filtration from the relatively low viscosity acrylic capper material, before the acrylic capper is reacted with the silicone, thereby achieving a significant advantage over the prior art methodology, in terms of processing time, ease of synthesis, and cost of the capped silicone product.

The acetoxy-functional silane compound which is described hereinabove as a preferred inert (second silane) capper species in the practice of the present invention, may suitably be synthesized in a manner analogous to the synthesis of the acrylic-functional capper, with the use of acetic acid in place of acrylic acid in the synthesis methodology described herein for the acrylic capper. Other carboxylic acids could also be used, in lieu of acetic acid, to produce other inert (second silane) capper species.

The features and advantages of the present invention are more fully illustrated by the following non-limiting examples, wherein all parts and percentages are by weight, unless otherwise expressly stated.

EXAMPLE 1

A 12 liter three neck round bottom flask equipped with a mechanical stirrer, and condenser, was charged with 7.5 liters heptane. 720 ml acrylic acid, 1900 ml triethylamine and 616 g of chloromethyldimethylchlorosilane then were sequentially added to the heptane solution under nitrogen atmosphere. The mixture was stirred at 100° C. for 5 hours and then filtered and stripped to give 929 g of the crude acryloxymethyldimethylacryloxysilane. GC analysis indicated the crude material had a high purity of >90%. The crude product can be further vacuum distilled at 0.5 mmHg and ~70° C. to improve its purity, if necessary.

EXAMPLE 2-4

Samples of acryloxymethyldimethylacryloxysilane prepared in accordance with the procedure of Example 1 were mixed in various ratios with a hydroxy-ended polydimethylsiloxane having a viscosity of 2000 cps., at room temperature for 15 minutes. To each mixed sample was further added 1.5% (w/w) diethoxyacetophenone. The mixtures then were cast as 75 mil films and irradiated for one minute per side with 70 mW/cm$^2$ UV radiation using a medium pressure mercury vapor lamp. The hardness values of the photocured films then were determined using a Shore 00 Durometer. Results are shown in Table I below, including the equivalents ratio of acryloxysilyl functionality of the capper to acryloxy-reactive functionality of the silicone in each sample.

TABLE I

| Example | Wt. of Capper (Example 1) | Wt. of Silicone | Shore 00 Durometer Hardness | Equivalents Ratio |
|---|---|---|---|---|
| Example 2 | 1.8 g | 150 g | No cure | 0.5 |
| Example 3 | 2.7 g | 150 g | 28 | 0.75 |
| Example 4 | 3.6 g | 150 g | 57 | 1.0 |

EXAMPLE 5

Acryloxymethyldimethylacryloxysilane was prepared in accordance with the procedure of Example 1, and acetoxymethyldimethylacetoxysilane was prepared by the same procedure using acetic acid in place of acrylic acid.

Acryloxymethyldimethylacryloxysilane (5.76g) and acetoxymethyldimethylacetoxysilane (5.44g) were mixed and added to a silanol-terminated polydimethylsiloxane (468g; viscosity=2,000 cps) at room temperature. The mixture was heated to 60° C. for one hour. Methanol (8.60g) then was added. The mixture was further stirred at 60° C. for one hour, following which the mixture was vacuum stripped to remove all volatile materials therefrom. The resulting material was mixed with photoinitiator and UV cured to produce a soft gel, which was too soft to measure its hardness using a durometer gauge.

EXAMPLE 6

To 60 g of hydroxy-terminated polymethylphenylsiloxane (viscosity=2400 cps; Baysilone Polymer 3176) was added 2.2 g acryloxymethyldimethylacryloxysilane and 0.6 g diethoxyacetophenone at room temperature. The mixture was stirred for 30 seconds and de-aired for 5 minutes. The mixture then was cast in a 75 mil thickness film and irradiated in a medium pressure mercury vapor UV chamber for 1 minute per side with a 70 mW/cm$^2$ UV intensity. The material cured to an elastomer having a Shore (00) durometer hardness of 62.

EXAMPLE 7

For comparison purposes, a silanol-terminated polydimethylsiloxane of the type used in Example 5 was fully capped with acryloxymethyldimethylacryloxysilane (prepared in accordance with the procedure of Example 1). Following UV cure, this fully endcapped material had a durometer (00) reading of 75.

The foregoing examples show that the silyl diacrylate compound is an effective capper for imparting UV radiation curable character to a silanol-terminated silicone, and that when used in combination with acetoxymethyldimethylacetoxysilane as an inert capper, as in Example 5, the resulting capped silicone when photocured under UV radiation yielded a soft gel product. By contrast, a substantially hard, tough material was produced by completely capping a corresponding silicone with only the acrylic capper (Example 7).

While the invention has been described with reference to specific features and embodiment thereof, it will be appreciated that numerous variations, modifications, and alternative embodiments exist, and all such variations, modifications, and embodiments are to be regarded as being within the spirit and scope of the invention.

What is claimed is:

1. A silicone composition, comprising:
   (a) a first silane of the formula:

$$R_2\atop R_1{>}C{=}C{-}\underset{R_3}{\overset{O}{\overset{\|}{C}}}{-}O{-}{\left(\underset{R_4}{\overset{R_5}{\overset{|}{C}}}{-}\right)_n}\underset{R_6}{\overset{R_7}{\overset{|}{Si}}}{-}O{-}\overset{O}{\overset{\|}{C}}{-}C{=}C\overset{R_9}{\underset{R_{10}}{<}}$$

wherein:
  $R_1$, $R_2$, $R_3$, $R_4$, $R_5$, $R_6$, $R_7$, $R_8$, $R_9$, and $R_{10}$ are independently selected from hydrogen, halo, and organo radicals; and
  n is an integer having a value of from 1 to 4;
   (b) a second silane of the formula:

$$R_{11}{-}\overset{O}{\overset{\|}{C}}{-}O{-}{\left(\underset{R_{12}}{\overset{R_{13}}{\overset{|}{C}}}{-}\right)_n}\underset{R_{14}}{\overset{R_{15}}{\overset{|}{Si}}}{-}O{-}\overset{O}{\overset{\|}{C}}{-}R_{16}$$

wherein:
  $R_{11}$ and $R_{16}$ are non-polymerizable groups and are independently selected from halo and organo radicals;
  $R_{12}$, $R_{13}$, $R_{14}$, and $R_{15}$ are independently selected from hydrogen, halo, and organo radicals; and
  n is an integer having a value of from 1 to 4; and
   (c) a polysiloxane having at least two functional groups per molecule with which said first and second silanes are cappingly and non-hydrolyzingly reactive;
wherein: (1) the first and second silanes together are provided in sufficient quantity relative to said polysilxane to non-hydrolyzingly react with substantially all of the cappingly reactive functional groups of the polysiloxane, and (2) the first silane constitutes from about 50% to about 98% by weight of the total weight of the first and second silanes.

2. A composition according to claim 1, wherein the first silane constitutes from about 70% to about 90% by weight of the total weight of the first and second silanes.

3. A composition according to claim 1, wherein the first and second silanes together are provided in sufficient quantity relative to the polysiloxane to react essentially completely with the cappingly reactive functional groups of the polysiloxane.

4. A composition according to claim 1, wherein $R_{11}$ and $R_{16}$ are independently selected from hydrocarbyl, fluorocarbyl, and fluorohydrocarbyl.

5. A composition according to claim 1, wherein $R_{11}$ and $R_{16}$ are independently selected from organo groups containing from 1 to 8 carbon atoms.

6. A composition according to claim 1, wherein $R_{11}$ and $R_{16}$ are independently selected from $C_1$-$C_8$ alkyl.

7. A composition according to claim 1, wherein the second silane contains at least two acetoxy functional groups.

8. A composition according to claim 1, wherein $R_1$, $R_2$, $R_3$, $R_4$, $R_5$, $R_8$, $R_9$, and $R_{10}$ are independently selected from hydrogen and $C_1$-$C_8$ alkyl.

9. A composition according to claim 1, wherein $R_6$ and $R_7$ are independently selected from hydrogen, phenyl, and $C_1$-$C_8$ alkyl.

10. A composition according to claim 1, wherein $R_1$, $R_2$, $R_9$, and $R_{10}$ are hydrogen; $R_4$ and $R_5$ are each methyl; $R_6$ and $R_7$ are independently selected from hydrogen, methyl, and phenyl; and $R_3$ and $R_8$ are independently selected from hydrogen and methyl.

11. A composition according to claim 1, wherein $R_{11}$ and $R_{16}$ are independently selected from $C_1$-$C_8$ alkyl and phenyl.

12. A composition according to claim 1, wherein $R_{14}$ and $R_{15}$ are independently selected from the group consisting of hydrogen, $C_1$-$C_8$ alkyl, and phenyl.

13. A composition according to claim 1, wherein $R_{11}$ and $R_{16}$ are each methyl.

14. A composition according to claim 1, wherein n for each of said first and second silanes is 1.

15. A composition according to claim 1, additionally comprising
   (d) a third silane of the formula:

$$G{-}\overset{O}{\overset{\|}{C}}{-}O{-}{\left(\underset{R_4}{\overset{R_5}{\overset{|}{C}}}{-}\right)_n}\underset{R_6}{\overset{R_7}{\overset{|}{Si}}}{-}O{-}\overset{O}{\overset{\|}{C}}{-}X$$

wherein:
  $R_4$, $R_5$, $R_6$, and $R_7$ and n have the same meanings as in the first silane formula;
  one of the G and X groups is $$R_2\atop R_1{>}C{=}\underset{R_3}{\overset{|}{C}}{-},$$

wherein:
  $R_1$, $R_2$, and $R_3$ have the same means as in the first silane formula, and the other of the G and X groups is $R_{11}$ having the same means as in the second silane formula.

16. A composition according to claim 1, wherein said polysiloxane functional groups comprise silicon-bonded functional groups including labile hydrogen constituents.

17. A composition according to claim 1, wherein said polysiloxane functional groups comprise functionality selected from the group consisting of:
  —OH;
  —N(R')$_2$, wherein each of the R' substituents is independently selected form hydrogen and organo groups, with the proviso that at least one R' substituent is hydrogen;
  —SH;
  —SO$_3$H; and

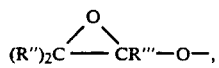

wherein each of the R″ and R‴ substituents is independently selected from hydrogen and organo groups:
with the proviso that said silicone functionality is

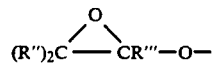

only when the first and second silanes are present with residual acrylic acid groups deriving from the synthesis of at least one of the first and second silanes.

18. A composition according to claim 1, wherein said polysiloxane having at least two functional groups per molecule with which said first and second silanes are cappingly and non-hydrolyzingly reactive, comprises a linear polydiorganosiloxane.

19. A composition according to claim 1, wherein said polysiloxane functional groups comprise a terminal reactive functional group.

20. A composition according to claim 1, wherein said polysiloxane comprises a linear silicone with hydroxy functional groups at its termini.

21. A composition according to claim 20, wherein said linear silicone has a weight average molecular weight of from about 700 to about 300,000.

22. A composition according to claim 1, wherein the second silane comprises acetoxymethyldimethylacetoxysilane.

23. A composition according to claim 1, wherein said first silane has the formula:

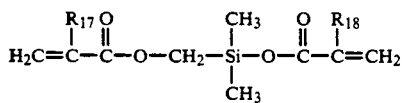

wherein $R_{17}$ and $R_{18}$ are independently selected from H and methyl.

24. A composition according to claim 1, wherein the equivalents ratio of acryloxy functionality of said first silane to polysiloxane functional groups non-hydrolyzingly reactive with said first silane is less than 1.0.

25. A photocured silicone material produced by curing a composition according to claim 1, under conditions curingly effective therefor.

26. A silicone composition, comprising:
a polysiloxane having at least two acryloxy-reactive functional sites per molecule; and
a composition comprising capping species non-hydrolyzingly reactive with said functional sites of said polysiloxane, including acryloxy functionality and non-polymerizable functionality, which when non-hydrolyzingly reacted with said polysiloxane functional sites are cappingly effective therefor to provide acryloxy functionality and non-polymerizable functionality on said polysiloxane, such that the acryloxy functionality on the capped polysiloxane functionalizes from about 50% to about 98% of the reactive functional sites on the polysiloxane, and the non-polymerizable functionality functionalizes the remaining reactive functional sites on the polysiloxane.

27. A composition according to claim 26, wherein the capping composition comprises a silane compound having acryloxy and non-polymerizable functionality in the same molecule.

28. A photocurable polysiloxane composition, comprising the non-hydrolysis reaction product of the composition of claim 26.

29. A photocured silicone material produced by curing the composition of claim 28, under conditions curingly effective therefor.

30. A method of capping a silicone having active hydrogen-containing functionality with (i) acrylic functionality to render the silicone photocurable in character, and with (ii) non-reactive functionality, comprising non-hydrolyzingly reacting the active hydrogen-containing functionality of said silicone with:

(A) a silyl diacrylate compound of the formula:

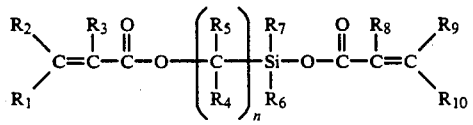

wherein:
$R_1$, $R_2$, $R_3$, $R_4$, $R_5$, $R_6$, $R_7$, $R_8$, and $R_{10}$ are independently selected from hydrogen, halo, and organo radicals; and
n is an integer having a value of from 1 to 4; and (B) a silane compound of the formula:

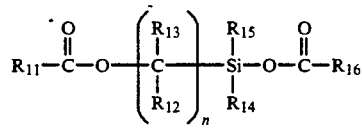

wherein:
$R_{11}$ and $R_{16}$ are non-polymerizable groups and are independently selected from halo and organo radicals; and
$R_{12}$, $R_{13}$, $R_{14}$, are independently selected from hydrogen, halo, and organo radicals,
to yield a capped silicone having from about 50% to about 98% of the active hydrogen-containing functionality of the silicone capped with acryloxy functionality deriving from said silyl diacrylate compound, and the remainder of the active hydrogen-containing functionality of the silicone capped with capping moieties derived from said silane compound.

31. A method according to claim 30, wherein said silicone cappable functionality comprises a functionality selected form the group consisting of:
—OH;
—N(R′)$_2$, wherein each of the R′ substituents is independently selected from hydrogen and organo groups, with the proviso that at least one R′ substituent is hydrogen;
—SH; and
—SO$_3$H.

32. A method according to claim 30, wherein said silane diacrylate has the formula:

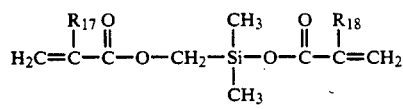

wherein $R_{17}$ and $R_{18}$ are independently selected form H and methyl.

33. A method according to claim 30, further comprising forming a silicone composition which is photocurable to a gel, comprising mixing the capped silicone with a photoinitiator.

34. A method according to claim 33, wherein the photoinitiator is selected from the group consisting of benzophenone, benzoin, acetophenone, benzil, and substituted forms thereof, and mixtures thereof.

35. A method according to claim 33, further comprising exposing said photocurable silicone gel composition to radiation curingly effective therefor, to yield a photocured silicone composition.

36. A method according to claim 35, wherein said radiation comprises ultraviolet radiation.

* * * * *